(No Model.)
O. HOFMANN.
PROCESS OF EXTRACTING SILVER FROM ITS ORES BY LIXIVIATION.
No. 366,103. Patented July 5, 1887.
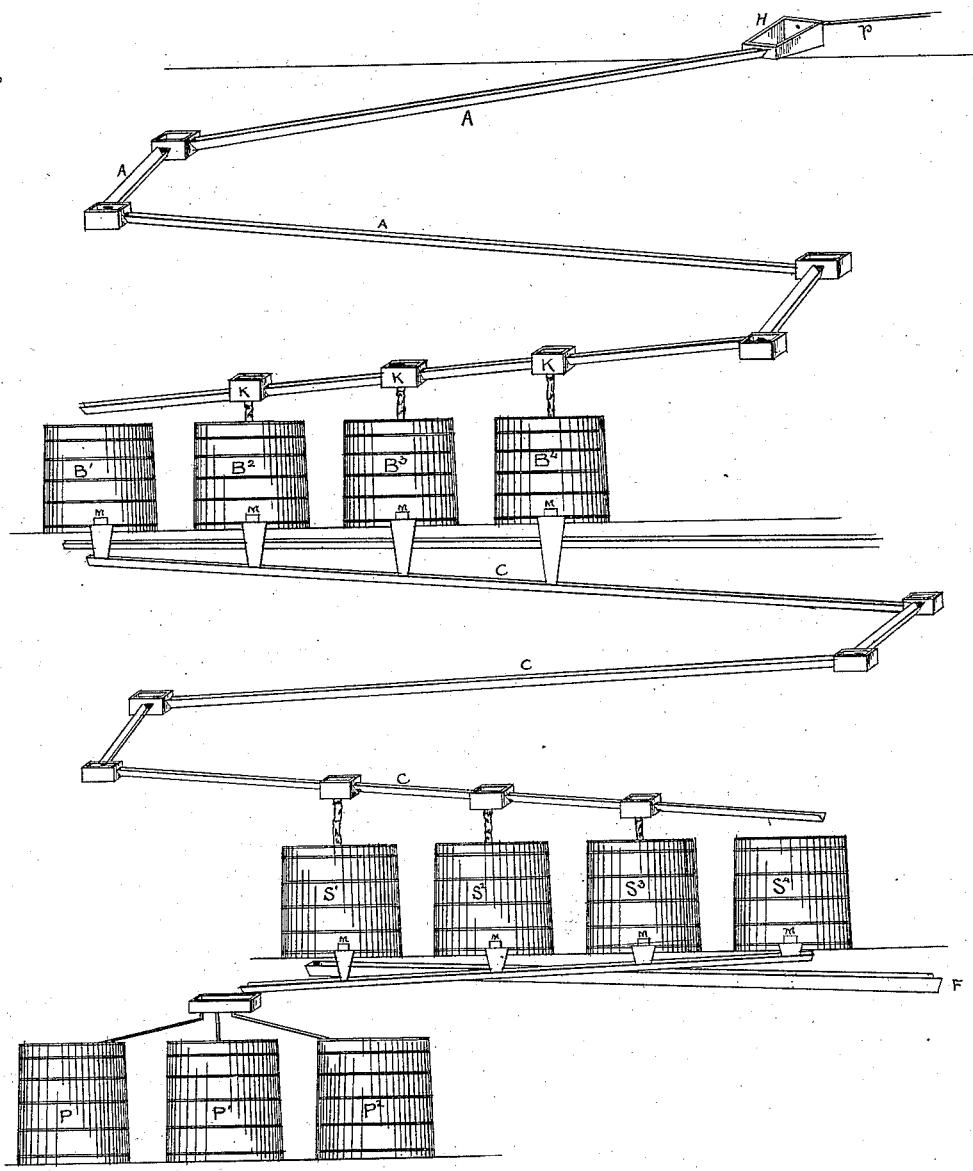
Witnesses.
Inventor.
Ottokar Hofmann

United States Patent Office.

OTTOKAR HOFMANN, OF ALAMEDA, CALIFORNIA.

PROCESS OF EXTRACTING SILVER FROM ITS ORES BY LIXIVIATION.

SPECIFICATION forming part of Letters Patent No. 366,103, dated July 5, 1887.

Application filed November 18, 1886. Serial No. 219,333. (No model.)

*To all whom it may concern:*

Be it known that I, OTTOKAR HOFMANN, of the town and county of Alameda, State of California, now in the town of Cusihuiriachic, State of Chihuahua, Mexico, have invented an Improvement in the Extraction of Silver from its Ores by the Wet or Lixiviation Process; and I declare the following to be a full, clear, and exact description thereof.

My invention relates to a certain improvement in the lixiviation process by which the ore, after having been subjected to a chloridizing roasting, is introduced in a series of troughs, first, together with water to dissolve the base-metal chlorides, and, second, together with the solution used in the ordinary lixiviation process to dissolve the silver. The ore and water are introduced either by means of a mixing-box or an agitator, and are allowed to flow in these troughs for some distance and finally conveyed by them into settling-tanks. The water while running in the troughs dissolves the base-metal chlorides. In the settling-tanks the ore separates quickly from the liquid. The latter is drawn off and conveyed to other tanks for the usual treatment. The ore sediment containing the silver is now sluiced or charged again in a similar series of troughs with a solution which has the property of dissolving chloride of silver, like hyposulphite of lime or soda, concentrated salt solution, Russel's "extra solution," (a compound of hyposulphite of lime or soda and blue-stone,) &c. By passing through these second series of troughs the silver chloride dissolves. Ore and solution run into tanks which are provided with filter bottoms and allowed to separate. The tailings settle to the bottom, while the clear solution, now containing the silver, is drawn off and conveyed into the precipitation-tanks for the usual treatment.

To make the nature of my improvement better understood, I will give a brief description of the old lixiviation method by which silver ores are treated.

Until now the ore, after having been subjected to a chloridizing roasting, is charged into tanks or vats, which are provided with a filter-bottom. Then a stream of water is introduced on the top of the ore. The water filtering through the ore dissolves the base-metal chlorides and discharges through a pipe below the filter. After the base-metal chlorides have been removed a stream of a solution of hyposulphite of lime or soda is introduced on the top of the ore, which, in passing or filtering through, dissolves the chloride of silver. This solution is conveyed to the precipitation-tanks, where the silver is precipitated by polysulphide of calcium or sodium. The time required for extracting the base metals and silver depends to a great extent on the filtering capacity of the ore, and varies from twelve hours to four and five days, or longer.

Some ores, on account of their clayish nature, cannot be worked by lixiviation at all, as neither water nor solution can filter through. If an ore filters badly, and has to be kept so long in contact with the solution, a part of the chloride of silver is liable to be decomposed by reaction of other chemicals—like caustic lime, &c.—and is lost, which is not perceptible if the extraction is performed quickly. Furthermore, if for the extraction of the base-metal chlorides the water passes through the ore, it becomes first very concentrated in chloride salts, which when concentrated have the property to dissolve chloride of silver, while the same salts, if diluted, do not dissolve it. To get silver into the base-metal solution is a defect of the lixiviation process. By charging ore and water into a trough the proportion of ore and water can be so regulated that the liquid, after dissolving the base-metal salts, is diluted enough not to dissolve silver.

Referring to annexed diagram, which outlines the principles of the new plant, I will describe as briefly as possible the manipulation of my improved method, which I will term "continuous lixiviation."

The ore is charged continuously in the hopper H, while at the same time a stream of water is introduced by pipe P. Instead of the hopper, an agitator can be used. From the hopper H the water carries the ore into the troughs A A and moves it on a downgrade. The motion is rapid, and each particle of ore exposes itself to the solving power of the water. The troughs are best arranged in zig-zag form, and can be placed outside the main building. The last trough is provided with as many boxes K as there are settling-tanks, and each box is provided again with an outlet in the bottom to enable the operator to fill any one of the settling-tanks. When tank B' is filled, the stream is turned into B². While B² is filling, the ore in B' settles, and the clear solution is drawn off by means of siphons into the base-metal trough D.

If tank B' is not ready by the time B² is filled, then the stream is turned into B³; but if ready, then into B' again. This is so often repeated until one or two of the settling-tanks are heavily charged with ore. Then the little door M near the bottom is opened and the ore sluiced out with a stream of solution. The ore and solution enter the troughs C C, and by passing through the chloride of silver dissolves, and the solid particles, together with the solution, drop into the silver-settling tanks S' S² S³ S⁴ as tailings. The trough arrangement and manipulation for the silver extraction are, in the main, the same as for the base-metal extraction. The silver-settling tanks, however, are provided with a filter bottom to enable the operator to let the sediment drain after the silver solution has been drawn off, and to wash out that part of the solution which is absorbed by the ore. The silver solution when drawn off is conveyed to the silver-precipitation tanks P P' P² and treated as usual. The tailings are sluiced out into the tailings-trough F.

In reduction-works where continually-discharging roasting-furnaces are used, the trough A can commence from right under the ore-drop of the furnace. The hot ore, dropping into the stream of water, creates hot water, which is favorable for the extraction of the base metals. Such arrangement saves a great deal of manual labor.

The advantages of my improved and continuous lixiviation are as follows: First, it permits the successful treatment of bad or non-filtering ores by the lixiviation process, which before has not been practicable—like ores containing clay or limerock as gangue, also oxidized ores, &c.—in fact it permits the treatment of all classes of silver ores with the exception of those which, by their large percentage of lead, are classed as smelting ores; second, it saves a great deal of time, as the extraction of the silver and the other metals is performed in a very short time—in a few minutes—while flowing in the troughs; third, the plant of the new method is much more compact and can be erected for much less money; fourth, it is labor-saving, especially in works where continuous-discharging roasting-furnaces are used, as the ore is moved automatically by the stream of water from under the furnace to the settling-tanks; fifth, by it it can be avoided that the base-metal solution dissolves chloride of silver; sixth, even the finest flue-dust can be treated.

Having thus described my invention, what I claim as new, and desire to secure by Letters Patent, is—

1. The process herein described of dissolving out the silver salts remaining in chloridized ore after the extraction of the base-metal salts, which consists in introducing and mixing said ore in streams of a solution of hyposulphite of soda or other solvent freely moving in troughs and subsequently separating the dissolved silver salts from the residue, substantially as set forth.

2. The lixiviation process herein described, which consists in introducing and mixing the chloridized ore into a running stream of water, then passing the ore and water through a series of troughs until the base metals are dissolved, separating the solution of base metal from the undissolved portion, then passing the residue through a series of troughs with one or more running streams of solution of hyposulphite of soda or other solvent of silver salts, substantially as set forth.

OTTOKAR HOFMANN.

Witnesses:
H. O. REINHARDT,
F. BAZET.